United States Patent
Guim Bernat et al.

(10) Patent No.: US 11,991,054 B2
(45) Date of Patent: May 21, 2024

(54) JITTER-LESS DISTRIBUTED FUNCTION-AS-A-SERVICE USING FLAVOR CLUSTERING

(71) Applicant: Intel Corporation, Santa Clara, CA (US)

(72) Inventors: Francesc Guim Bernat, Barcelona (ES); Ned M. Smith, Beaverton, OR (US); Sunil Cheruvu, Tempe, AZ (US); Alexander Bachmutsky, Sunnyvale, CA (US); James Coleman, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 17/063,991

(22) Filed: Oct. 6, 2020

(65) Prior Publication Data

US 2021/0021485 A1     Jan. 21, 2021

(51) Int. Cl.
*H04L 12/24*     (2006.01)
*H04L 12/26*     (2006.01)
(Continued)

(52) U.S. Cl.
CPC ...... *H04L 41/5022* (2013.01); *H04L 41/5003* (2013.01); *H04L 41/5096* (2013.01); *H04L 43/087* (2013.01); *H04L 67/288* (2013.01)

(58) Field of Classification Search
CPC ......... H04L 41/20; H04L 41/24; H04L 67/34; H04L 41/5041; H04L 67/20; H04L 41/06;
(Continued)

(56) References Cited

U.S. PATENT DOCUMENTS

| | | | |
|---|---|---|---|
| 7,609,637 B2 * | 10/2009 | Doshi | H04L 47/825 370/235 |
| 10,747,580 B2 | 8/2020 | Vaikar | |

(Continued)

FOREIGN PATENT DOCUMENTS

KR     1020200005507 A     1/2020

OTHER PUBLICATIONS

International Search Report and Written Opinion for PCT Patent Application No. PCT/US21/48213, dated Dec. 10, 2021, 14 pages.

*Primary Examiner* — Abdullahi E Salad
(74) *Attorney, Agent, or Firm* — Compass IP Law PC

(57) ABSTRACT

Methods and apparatus for jitter-less distributed Function as a Service (FaaS) using flavor clustering. A set of FaaS functions clustered by flavor chaining is implemented to deploy one or more FaaS flavor clusters on one or more edge nodes, wherein each flavor is defined by a set of resource requirements mapped into a jitter Quality of Service (QoS) and is executed on at least one hardware computing component on the one or more edge nodes. One or more jitter controllers are implemented to control and monitor execution of FaaS functions in the one or more FaaS flavor clusters such that the functions are executed to meet jitter-less QoS requirements. Jitter controllers include platform jitter-less function controllers in edge nodes and a data center FaaS jitter-less controller. A jitter-less Software Defined Wide Area Network (SD-WAN) network controller is also provided to provide network resources used by FaaS flavor clusters and satisfy connectivity requirements between the edge nodes.

20 Claims, 6 Drawing Sheets

(51) Int. Cl.
*H04L 29/08* (2006.01)
*H04L 41/50* (2022.01)
*H04L 41/5003* (2022.01)
*H04L 41/5022* (2022.01)
*H04L 43/087* (2022.01)
*H04L 67/288* (2022.01)

(58) Field of Classification Search
CPC ............ H04L 41/0893; H04L 41/5022; H04L 41/5003; H04L 43/087; H04L 67/288; H04L 41/5096
See application file for complete search history.

(56) References Cited

U.S. PATENT DOCUMENTS

| | | | |
|---|---|---|---|
| 2016/0028603 A1* | 1/2016 | Chakrabarti | H04L 43/20 370/252 |
| 2018/0077024 A1* | 3/2018 | Zhang | H04L 41/0896 |
| 2019/0123973 A1* | 4/2019 | Jeuk | G06F 9/5027 |
| 2019/0129745 A1 | 5/2019 | Wang | |
| 2019/0384655 A1* | 12/2019 | Krishna Singuru | G06F 9/542 |
| 2019/0391971 A1* | 12/2019 | Bernat | H04L 9/0637 |
| 2020/0195520 A1* | 6/2020 | Guim Bernat | G06F 30/34 |
| 2020/0296155 A1* | 9/2020 | McGrath | G06F 9/5027 |
| 2021/0021485 A1 | 1/2021 | Bernat et al. | |
| 2021/0263779 A1* | 8/2021 | Haghighat | G06F 21/78 |

\* cited by examiner

JITTER-LESS DISTRIBUTED FUNCTION-AS-A-SERVICE USING FLAVOR CLUSTERING

BACKGROUND INFORMATION

In order to implement more reliable, adaptive and scalable data centers and geographically distributed services hosting (e.g., edge or cloud data centers), utilization of functions as an architectural foundation is becoming more common. As an example, FIG. 1 shows an edge service that is implemented utilizing a chain of different functions distributed across multiple virtual nodes in a data center.

The left-hand portion of the diagram shows an FaaS (Functions as a Service) based real-time service edge workflow 100 showing two FaaS service chains implemented with instances of similar functions. The left hand service chain includes a virtual network function (VNF) 102, a VNF 104, an Accelerated Service (ASer.) 106, an Accelerated Service 108, and Accelerated Service 110, a service 112, a VNF 114, and the back to the user. Alternatively, the path is depicted as a VNF 1 instance to a VNF 3 instance to an ASer. 2 instance to ASer. 3 to ASer. 4 to Service 2 to a VNF 2 instance and back to the user. The right-hand service chain includes a VNF 103, a VNF 105, an application service 106, application service 108, application service 110, a service 113, and a VNF 115, and the back to the user. Alternatively, the path is shown as a VNF 1 instance to VNF 3 instance to an ASer. 2 instance to ASer. 3 to ASer. 4 to a Service 1 instance to a VNF 2.

The right side of FIG. 1 shows an edge data center 116 including a fabric 118, and platforms 120, 122, and 124. Platform 120 includes an artificial intelligence (AI) accelerator 128, an FPGA (Field Programmable Gate Array) 130, and an iNIC (Intelligent Network Interface Controller) 132. Each of platforms 122 and 124 include an FPGA 134, an Graphics Processing Unit (GPU) 136, an AI accelerator 138, and an iNIC 140.

Generally, the edge data center environment may support one or more of multi-tenancy, high load variability, real-time use cases, function-based services, multi-hardware function implementations, and hetero-hardware with some level of QoS (Quality of Service) knobs.

Note that each of the functions, depending on the underlying hardware and Service Level Agreement (SLA) as specified by the service, may be instantiated in multiple forms (e.g., FPGA based, x86 based, etc.), but each form may successfully execute the same workload—albeit with different latency, reliability and jitter properties. However, implementing distributed chains of functions as a service for services with strong requirements for low latency, predictable jitter and high reliability. Edge computing caters to use cases that have stronger requirements, such as manufacturing, V2V, V2X, safety, etc.

Solutions that satisfy these requirements increasingly are achieved with deterministic distributed execution, which has the following challenges:

1. Edge data centers are dynamically composed utilizing multiple compute nodes with different compute elements having different profiles. Hence, a FaaS service implementing a function F1 will experience different performance if it is executed in a far-edge system with server processor+FPGA compared to a near-system with Client CPU+MOVIDIUS™ vision processing unit.
2. Edge environments are living ecosystems. Hence, the aforementioned multi-nodes clusters will be: (1) connected to networks with different latency and throughput properties; (2) connected to networks that have different levels of saturation; (3) use nodes and their corresponding resources having variable utilization characteristics over time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
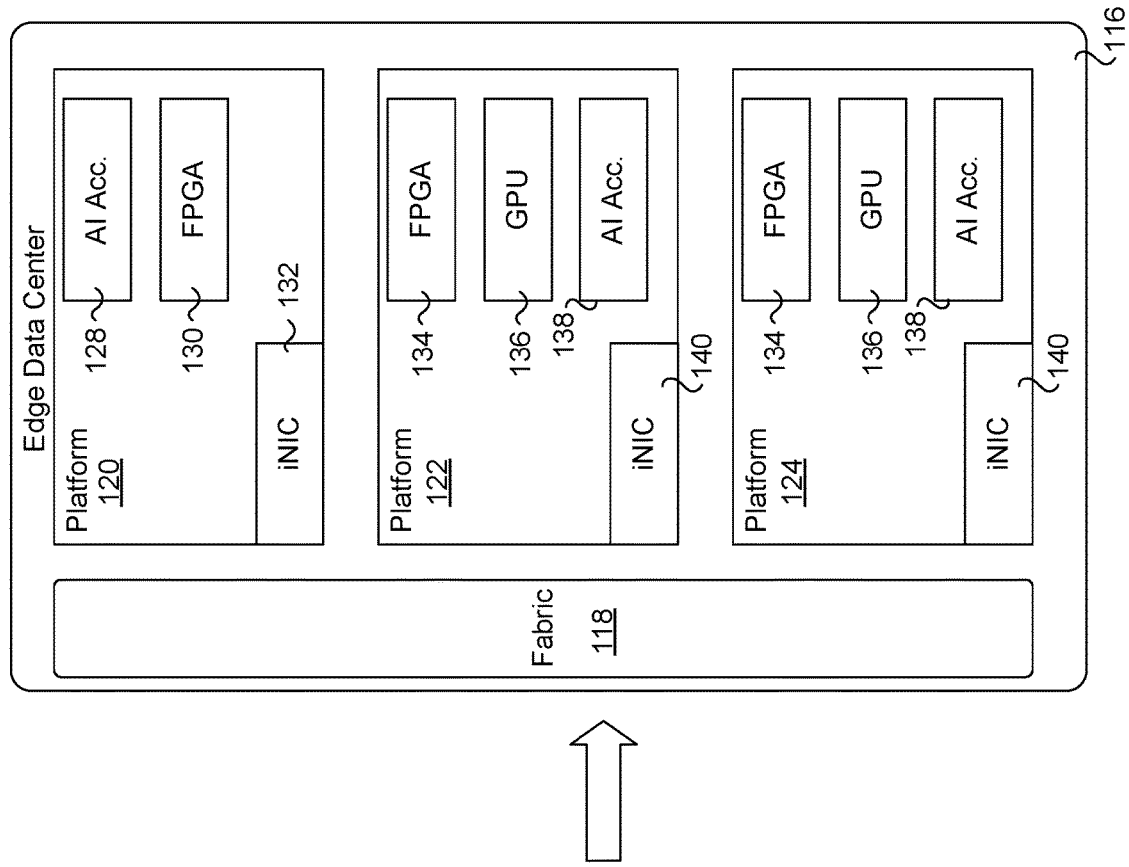
FIG. 1 is a schematic diagram of an edge service that is implemented utilizing a chain of different functions distributed across multiple virtual nodes in a data center.
Figure 1:
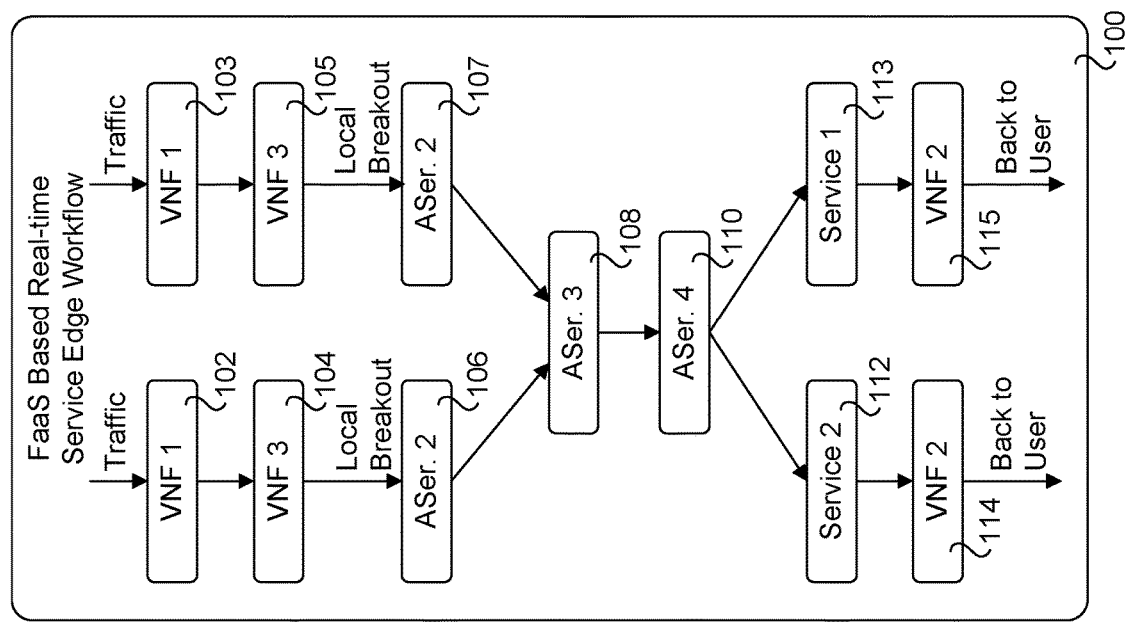

Embodiments of methods and apparatus for jitter-less distributed Function as a Service using flavor clustering are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In the context of services that provide certain levels of determinism, the data center architecture should employ mechanisms that overcome (1) and (2) above. In accordance with aspects of the embodiments described and illustrated herein, solutions employing (a) jitter-less or jitter-bound function-as-a-Service and (b) jitter-less or jitter bound FaaS as a service connector are provided. The deterministic chains in the embodiments are referring to as FaaS flavor clustering. Under aspects of the solutions the services are described and mapped to the underlying hardware architecture with support for flavors distributed across multiple Edge nodes making the execution deterministic.

In embodiments, there are multiple FaaS function implementations (also called flavors herein) available to system tenants (e.g., clients) for a given service being provided. The multiple FaaS function implementations can be performed by different combinations of hardware and software in the FaaS computing architecture, depending on multiple factors (such as available hardware, Quality of Service (QoS) requirements, cost, etc.). Embodiments may dynamically and adaptively select which flavor to be used for a requested function and/or use a predefined FaaS function service chain.

Figure 2A:
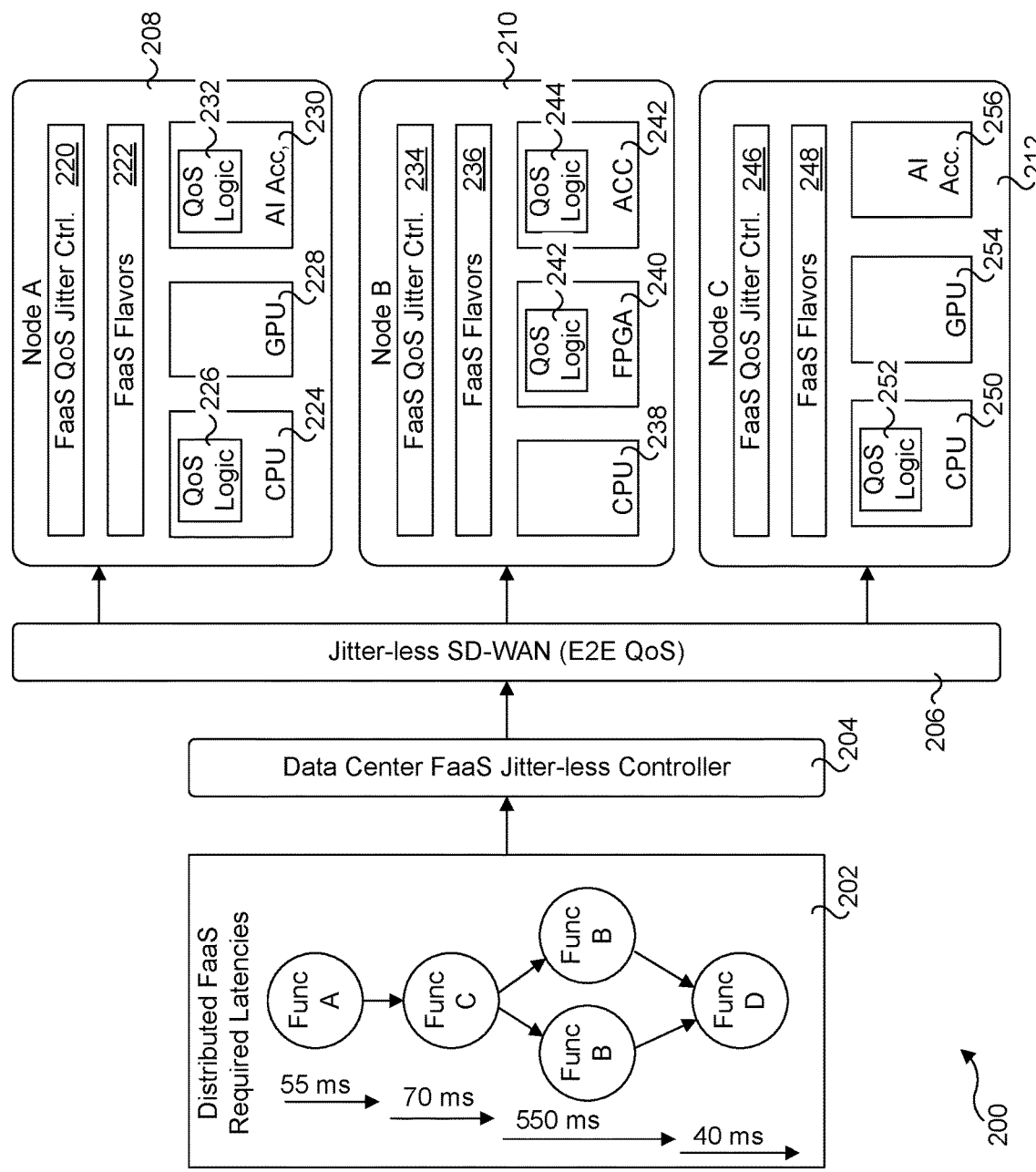
FIGS. 2a and 2b collective show an FaaS system architecture supporting jitter requirements, according to one embodiment.
Figure 2B:
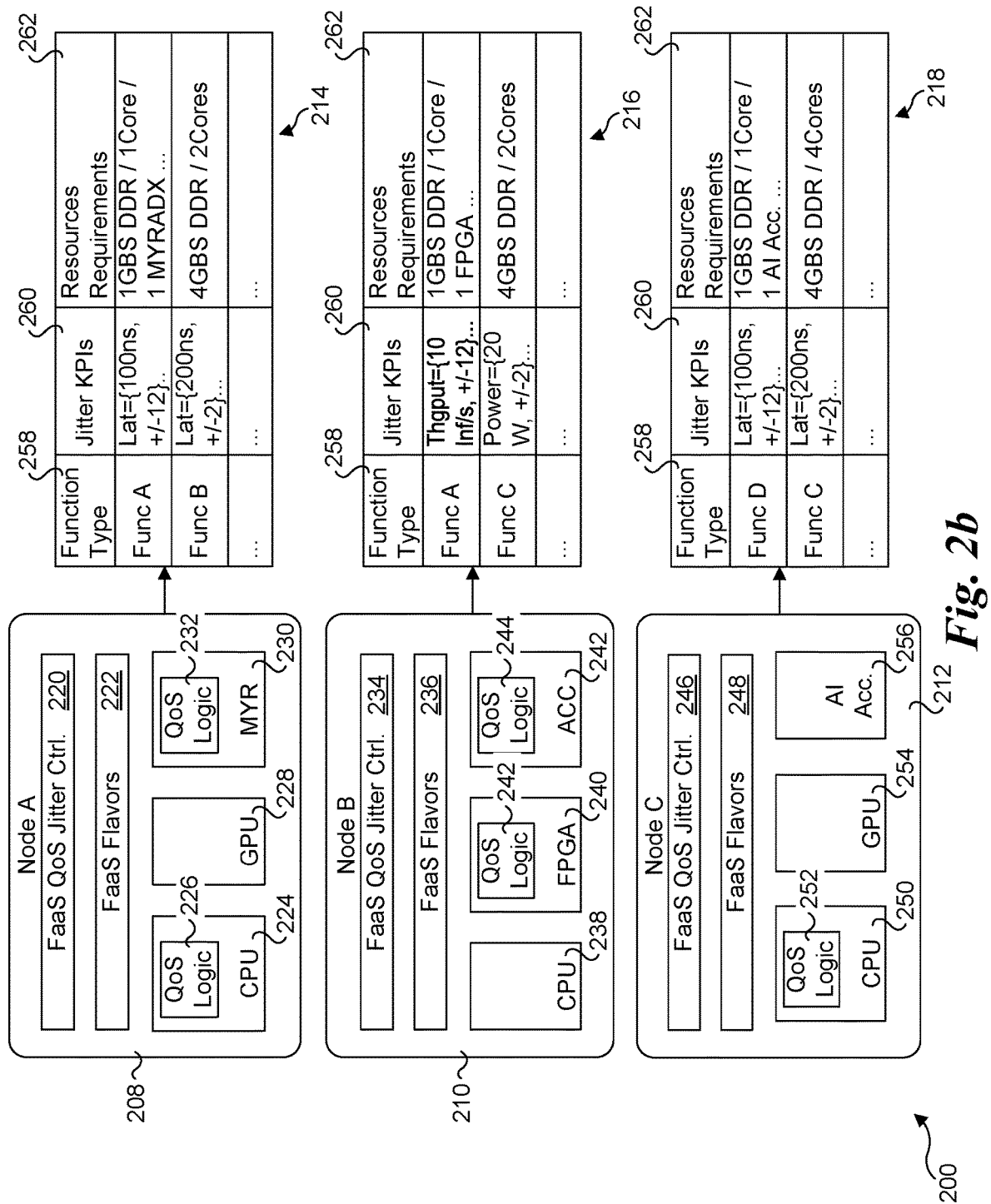

One embodiment of the solution is shown in FaaS system architecture 200 FIGS. 2a and 2b, which expands the current data center architecture with the following elements.
1. Each edge hosting node includes a set of FaaS functions clustered by flavor chaining to efficiently execute various groupings of function types (e.g., FuncA to FuncD in FIGS. 2a and 2b). Each flavor is defined by a set of resources requirements (which are mapped into jitter QoS). There is a set of quality-of-service control points used to achieve the jitter QoS for the aforementioned resources (e.g., resource director technology (RDT) knobs) and may describe bounded jitter metrics (e.g., metrics about acceptable latency, bandwidth, response time, etc.) that the flavor can guarantee given the various resources control points.
2. Each edge hosting location includes a Jitter controller that is responsible for executing a particular function and monitoring the particular bounded latency. For instance, it may guarantee a resource utilization scheme such as an RDT.
3. The edge architecture includes a novel concept of Jitter-less Software Defined Wide Area Network (SD-WAN) which is created for a particular chain of FaaS instances created in element (2) above. Each of these constructs expects guaranteed allocation of network resources (e.g., using DCB or other network E2E QoS methodologies) in order to guarantee the jitter-less QoS requirements and to satisfy connectivity requirements between each of the nodes in a FaaS flavor cluster.
4. The edge architecture includes a Data Center Jitter Controller that creates a Jitter-less SD-WAN and instantiates the various FaaS flavors with a corresponding Jitter-less QoS target in the various edge nodes in order to satisfy the requirements. The controller will monitor and enforce Jitter-less QoS during the life of the service.

As shown in FIGS. 2a and 2b, FaaS system architecture 200 includes top level components comprising a distributed FaaS 202, a data center FaaS jitter-less controller 204, a jitter-less SD-WAN 206, nodes 208, 210, and 212, and tables 214, 216, and 218. Distributed FaaS 202 includes single instances of functions A, C, and D, and two instance of function B. The required latency of the different functions is shown to the left of the functions.

Node 208 (Node A) includes an FaaS QoS jitter controller 220, FaaS flavors 222, a CPU 224 including QoS logic 226, an GPU 228, and an AI accelerator 230 including QoS logic 232. Node 210 (Node B) includes an FaaS QoS jitter controller 234, FaaS flavors 236, a CPU 238, and FPGA 240 including QoS logic 242, and an accelerator (ACC) 242 including QoS logic 244. Node 212 (Node C) includes an FaaS QoS jitter controller 246, FaaS flavors 248, a CPU 250 including QoS logic 252, an ATS 254, and a GPU-AI 256.

Moving to FIG. 2b, each of tables 214, 216, and 218 include a Function Type column 258, a Jitter Key Performance Indicators (KPIs) column 260, and a Resources Requirements column 262. Function Type column 258 lists the function type by function name (e.g., Func A, Func B, Func C, Func D). Jitter KPIs column 260 includes associated criteria such as latency (Lat), throughput (Thgput), and power. Resource Requirements column 262 lists hardware resource requirements, such as memory bandwidth, number of cores, number of FPGAs (if any), etc.

Software Architecture

Figure 3:
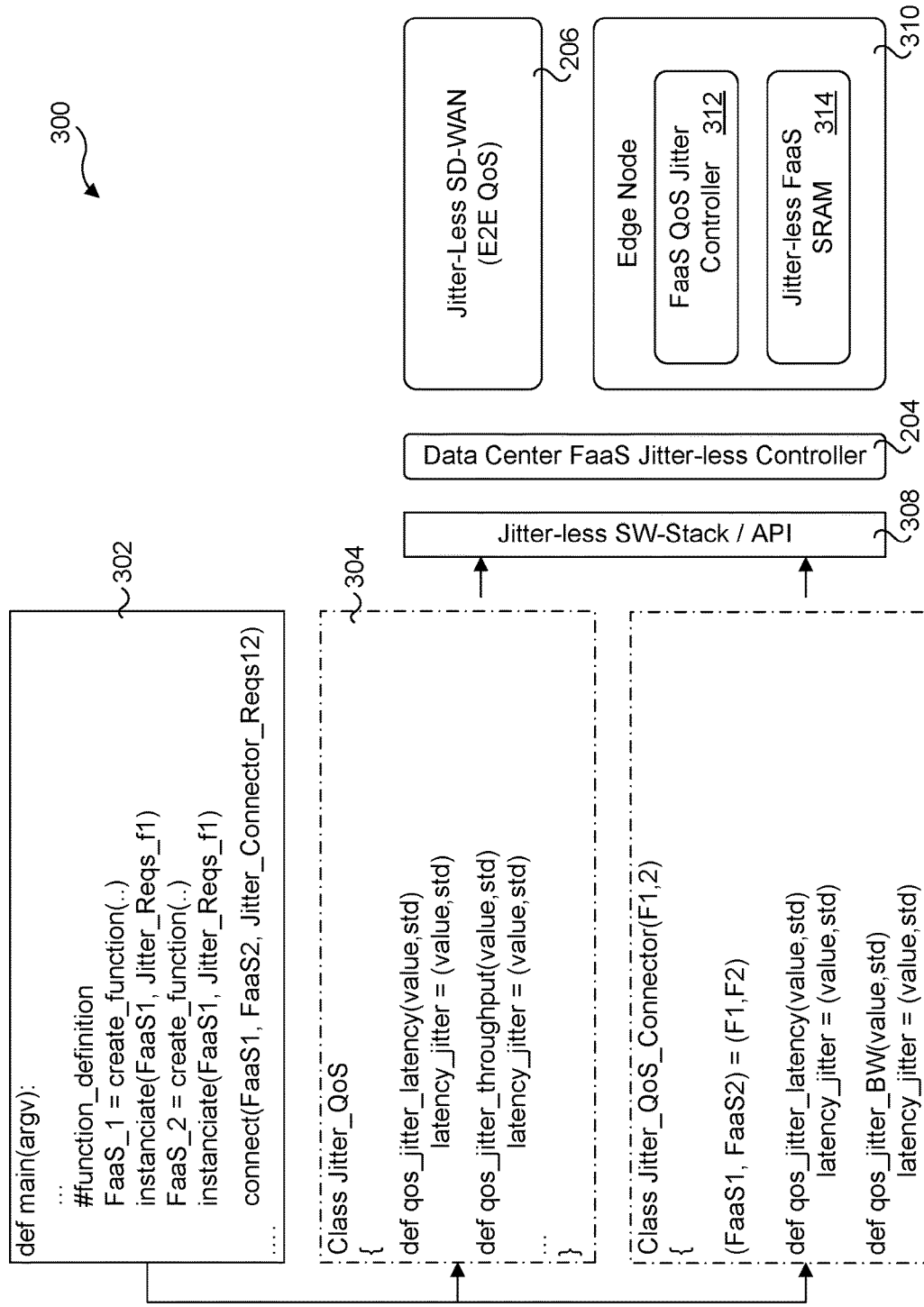
FIG. 3 is a diagram that provides an abstraction on how an embodiment of the architecture may be exposed and utilized by a service using FaaS with jitter requirements.

FIG. 3 shows a diagram 300 that provides an abstraction on how an embodiment of the architecture may be exposed and utilized by a service using FaaS (distributed or not across the data center) with jitter requirements. Generally, the terms 'jitter-less', 'jitter-free', 'jitter QoS' may be used to describe controlled jitter behavior.

Diagram 300 includes a main program section 302, a Jitter_QoS class 304, a Jitter_QoS_Connector class 306, a jitter-less software stack/API 308, a data center FaaS jitter-less controller 204, a jitter-less SD-WAN 206, and an edge node 310 including an FaaS QoS jitter controller 312 and a jitter-less FaaS SRAM (Synchronous Random Access Memory) 314.

Jitter_QoS class 304 and Jitter_QoS_Connector class 306 define the two main software interfaces (APIs) provided to the stack defining the FaaS chain (the example uses python as coding language but applies to any other type of programming model). Jitter_QoS class 304 specifies Jitter-QoS requirements for a particular function. After defining a particular function type (e.g., face detection, decoding image, encode, image etc.); Jitter_QoS class 304 allows communication of the jitter requirements, for that particular function, to the hardware platform. In one embodiment, the jitter requirements (Jitter_Reqs) is a list of three elements:
1 The metric or KPI for acceptable jitter. For instance, latency expected to execute the function, throughput needed for that function or even power required to execute the function.
2 The average or mean value associated to that KPI. Note that depending on the implementation of the described method different statistical estimators can be used to define what the reference or center of the jitter is.
3 The standard deviation or inter-quartile difference (IQR) associated to that KPI. Note that depending on the implementation of the described method different statistical estimators can be used to define what jitter is.

Jitter_QoS_Connector class 306 is used to specify the acceptable (or unacceptable) Jitter associated with the connectivity between the different FaaS functions in a Flavor cluster. Similarly, the interface allows specification of bandwidth and latency jitter requirements between two connected functions. In one embodiment, the requirements have the following properties:

1. The average (or mean) value associated with latency and bandwidth requirements. Depending on the implementation of the described method, different statistical estimators can be used to define the reference or center point for calculating deviation from the center point— aka jitter.
2. The standard deviation or IQR that is associated with the latency and bandwidth. Depending on the implementation of the described method different statistical estimators can be used to define jitter metrics.

Jitter_QoS class 304 and Jitter_QoS_Connector class 306 APIs are exposed by a framework that is responsible for communicating the expected hardware elements with the data center. Hardware context is necessary to instantiate and manage the appropriate jitter QoS elements and to satisfy the required jitter requirements.

Hardware and Data Center Architecture

Figure 4:
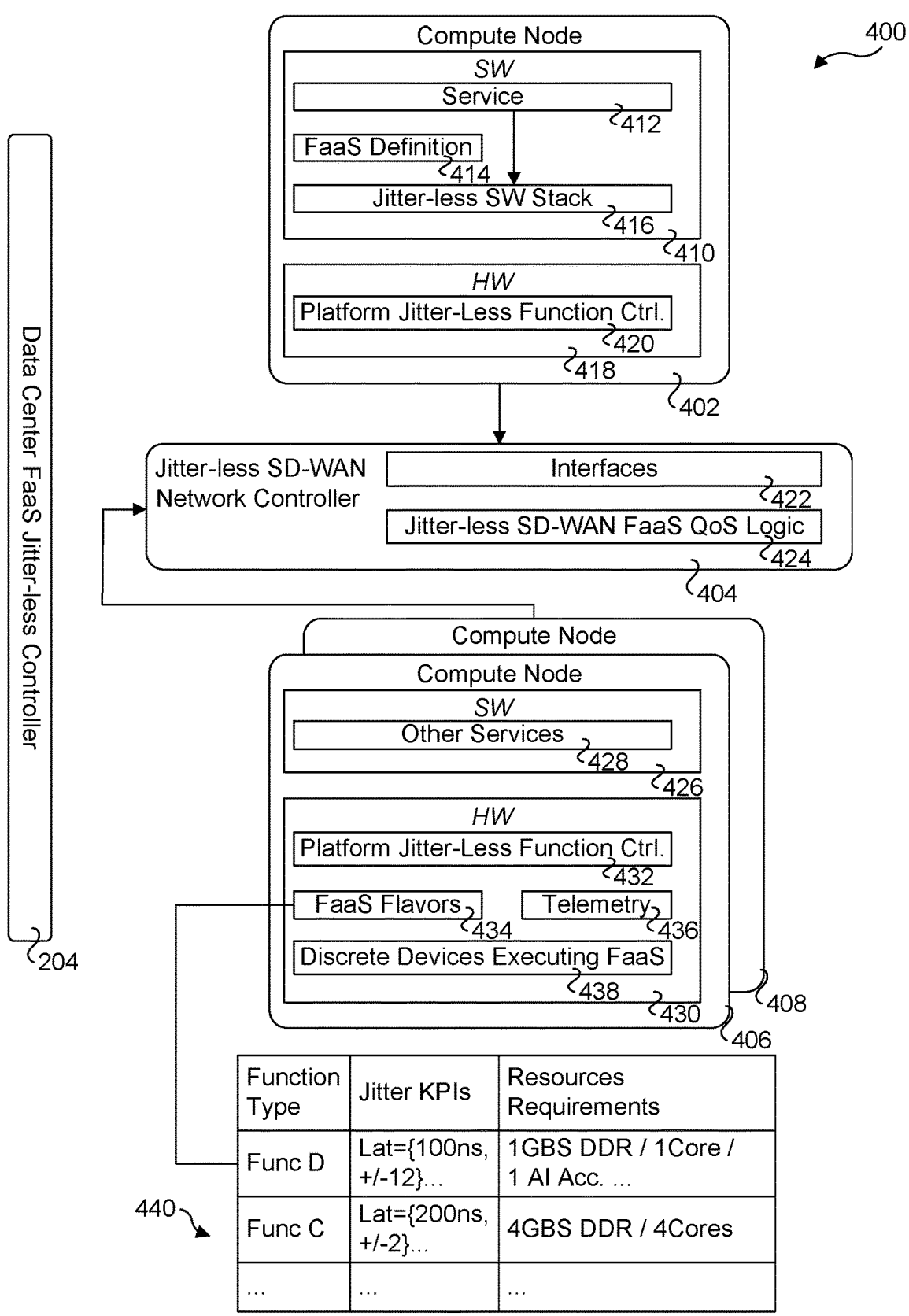
FIG. 4 is a schematic diagram illustrating an embodiment of a data center architecture that can be implemented to create the jitter-less or jitter-bounded function as a service chain.

FIG. 4 shows an embodiment of a data center architecture 400 that can be implemented to create the jitter-less or jitter-bounded function as a service chain. It defines changes in four main areas: (1) The software stacks abstracting communication and management of the data center jitter-less features (already discussed above); (2) A platform jitter less-function controller; (3) A data center FaaS jitter-less controller; and (4) A fabric jitter-less controller.

In further detail, the top-level components of data center architecture 400 include a compute node 402, a jitter-less SD-WAN network controller 404, compute nodes 406 and 408 and a data center FaaS jitter-less controller 204. Compute node 402 includes software 410 comprising a service 412, an FaaS definition 414, and a jitter-less software stack 416. Compute node 402 further includes hardware 418 comprising a platform jitter-less function controller 420. Jitter-less SD-WAN network controller 404 includes interfaces 422 and jitter-less SD-WAN FaaS QoS logic 424.

Each of compute nodes 406 and 408 have a similar configuration including software 426 comprising other services 428 and hardware 430 including a platform jitter-less function controller 432, FaaS flavors 434, telemetry 436, and discrete devices executing FaaS 438. FaaS flavors 434 are specified via entries in a table 440 having a configuration similar to tables 214, 216, and 218 in FIG. 2*b* and discussed above.

In one embodiment, platform jitter-less function controller 420 discovers FaaS flavors and jitter properties. It distributes and connects functions in real-time to be executed with corresponding jitter requirements. It also creates and configures a temporary jitter-less FaaS SD-WAN for an FaaS chain, and performs further functions described below.

Platform jitter-less function controller 432 manages FaaS request, including allocated required resources, set QoS knobs (RDT etc.; registers an FaaS SD-WAN connector (e.g., logic that connects an FaaS in an SD-WAN partition)); and executes and monitors FaaS functions. Platform jitter-less function controller 432 also broadcasts current capability to execute function flavors at different bandwidth and latency jitter.

Platform Jitter-Less Function Controller

The platform Jitter-less function controller (JFC) is responsible to instantiate and control the execution of a particular function which is connected to a particular FaaS Chain. A request coming from the jitter-less software stack to instantiate a function type with a particular jitter-less requirement creates the following events:
1 The controller identifies among all the different instances of a particular function type which is/are the one(s) that satisfies that requirements for the various KPIs provided by the Jitter_QoS API. The controller has a list of various functions types and their corresponding flavors (stored in a media device of the platforms). Each flavor includes:
   a. Its corresponding list of jitter-less supported QoS.
   b. The list of required resources to satisfy (a).
   c. The list of required QoS knobs for (b) required to satisfy (a).
2 The controller selects one of the flavors. This can be based on cost, on amount of required or available resources (FPGA, etc.).
3 The controller instantiates the flavor and executes when the software framework requires its execution. In some embodiments QoS knobs may not be enforced from the very beginning. It may monitor and enforce afterwards.

The JFC is responsible to revert periodically all the different flavors types and flavors jitter-QoS that the corresponding platform can satisfy. In another aspect, the JFCs on respective platforms operate in a distributed manner, coordinating operations across platforms to meet QoS metrics. For example, under a distributed FaaS chain instances of some functions may be implemented on multiple platforms, potentially using different hardware. The distributed JFCs coordinate which platform a given FaaS function executed on.

The Jitter-Less SD-WAN FaaS QoS Logic

The Edge, Cloud or IoT (Internet of Things) fabric (Ethernet, CXL (Compute Express Link) etc.) is responsible for creating and managing end-to-end QoS connections between various FaaS server and flavor cluster nodes that are part of an FaaS chain. As discussed above, embodiments herein implement the concept of a "Jitter-Less SD-WAN FaaS" (JL SD-WAN). A JL SD-WAN is a dynamic and temporal configuration of the fabric that comprehends multiple point-to-point (virtual/actual) connections that have guaranteed jitter behavior based on known jitter requirements. The network elements connect to and assure the jitter controller(s) can be either hardware elements (such as physical switches) or software elements (such as cloud service routers (CSRs)). In one embodiment, the following behaviors are expected:
1. The fabric controller (e.g., hosted in a system server) exposes a new functionality (with the corresponding interface) to create a temporal JL SD-WAN composed by a list of point-to-point connections between pairs of functions. In one embodiment, each of these follow the requirements outlined for Jitter_QoS_Sonnector class 306 above.
2. The different physical switches and network elements (such as NIC) providing connectivity between servers on the system includes a new mechanism that monitors and provides the required jitter for a particular traffic going from a function A to a function B. The fabric switches are implemented to understand the concept of jitter and function to function stream (associated to the temporal JL SD-WAN).

The Data Center FaaS Jitter-Less Controller

The data center FaaS jitter-less controller, such as data center FaaS jitter-less controller 204, orchestrates, creates, monitors and destroys the various FaaS chains that a user may submit to an orchestrator or workload execution scheduler to create a jitter-less chain of FaaS servers or Flavor clusters. This controller is responsible for accounting as well for configuring the various types of functions and their corresponding jitter flavors available to the different compute nodes in the data center or edge. In one embodiment the nodes are responsible for providing such information periodically. In one embodiment, on a request to create a new chain the data center FaaS jitter-less controller will:
1. Identify the various nodes that currently have capacity to execute the required functions with the various jitter flavors.
2. Given the required connectivity between the flavors, identify (this may require interactions with the JL SD-WAN controller) which of those nodes can provide the required connectivity jitter between each pair of connected functions.
3. Select the list on compute nodes that satisfy both (a) and (b). If multiple options are considered it may select the less loaded nodes, the less expensive one etc.
4. Create the chain of functions: (1) instantiate flavors; (2) create the JL SD-WAN; (3) configure the nodes in order to connect the functions to the JL-SDWAN; (4) start the execution and monitor it's flow (jitter).

Deterministic Hardware

The execution environment (e.g. accelerator, CPU, TEE, co-processor) that is responsible for hosting a workload with jitter QoS requirements may use programmable state machines to ensure each step of execution occurs within an acceptable jitter metric. The workload is modularized into "states" where execution of the sub-module is guaranteed to complete within the expected jitter metric.

Detecting Jitters and Mitigating them in Hardware

TABLE 1 lists different sources of jitter, associated conditions, and potential mitigations in the edge node platform hardware, according to one embodiment.

TABLE 1

| Source of Jitter | Conditions | Mitigation | Note: |
|---|---|---|---|
| ECC | ECC Error Count | None: DIMM is likely failing, Node should not be used. | |
| IBECC | RSB Miss Count | None: Address Pattern is conflicting with RSB uArch | |
| Parity | Parity error count | None: Part is likely failing, Node should not be used | |
| Mem. Thermal Throttle | Thermal Event Count | Use RDT memory bandwidth to determine which SW threads are generating excessive memory traffic, and load balance the nodes by migrating them to other nodes. | Keeping the memory BW intensive workloads on the same node might be ideal as this would ensure the other nodes are more deterministic |
| DRAM RAPL | RAPL event counter | | |
| DDR Timing Conflicts | DDR timing conflict counters | None: Address Pattern is conflicting with DDR uArch | |
| Store Buffer full | Store buffer full event counter | Store buffer QoS can be invoked on other cores/threads to reduce back pressure | |
| Bus locks | Bus lock event counters | Bus Lock DOS mechanism, or #AC on split lock protection, with workaround | |
| SMI | SMI counter | None: Firmware implements utilized functionality via SMI, this node should be avoided. | |
| Shared Cache (L2) | L2 Cache misses & RDT residency counters | CAT could be opportunistically employed to minimize the thrash from the noisy neighbor. | |
| Shared Cache (LLC) | LLC Cache misses & RDT residency counters | CAT/GT_CLOS could be opportunistically employed to minimize the thrash from the noisy neighbor. | |
| ASPM | ASPM state transition event could be counted/ ASPM enable/disable be detected | Disable ASPM when the level of determinism precludes having this power saving feature enabled. | |
| Uncore P-State transitions | State transition counters | Set min/max frequency to the same to eliminate the adverse performance impact of excessive transitions | |
| Thermal Throttling events core/uncore | Thermal Event counters | | |
| IOTLB Miss | IO-TLB miss count | IO-TLB QOS: can be employed to reduce the number of ways that | |

TABLE 1-continued

| Source of Jitter | Conditions | Mitigation | Note: |
| --- | --- | --- | --- |
| | | the thrashing IO flows have access to | |

The information in TABLE 1 may be used to create the aforementioned knobs and grade the capability of edge nodes to meet certain jitter QoS and subsequently make the decisions to either deploy the workloads or skip the nodes that are incapable of meeting the required jitter QoS. The conditions can be utilized to detect the degradation of the QoS during the execution of the function, before or after.

Example Compute Node

Figure 5:
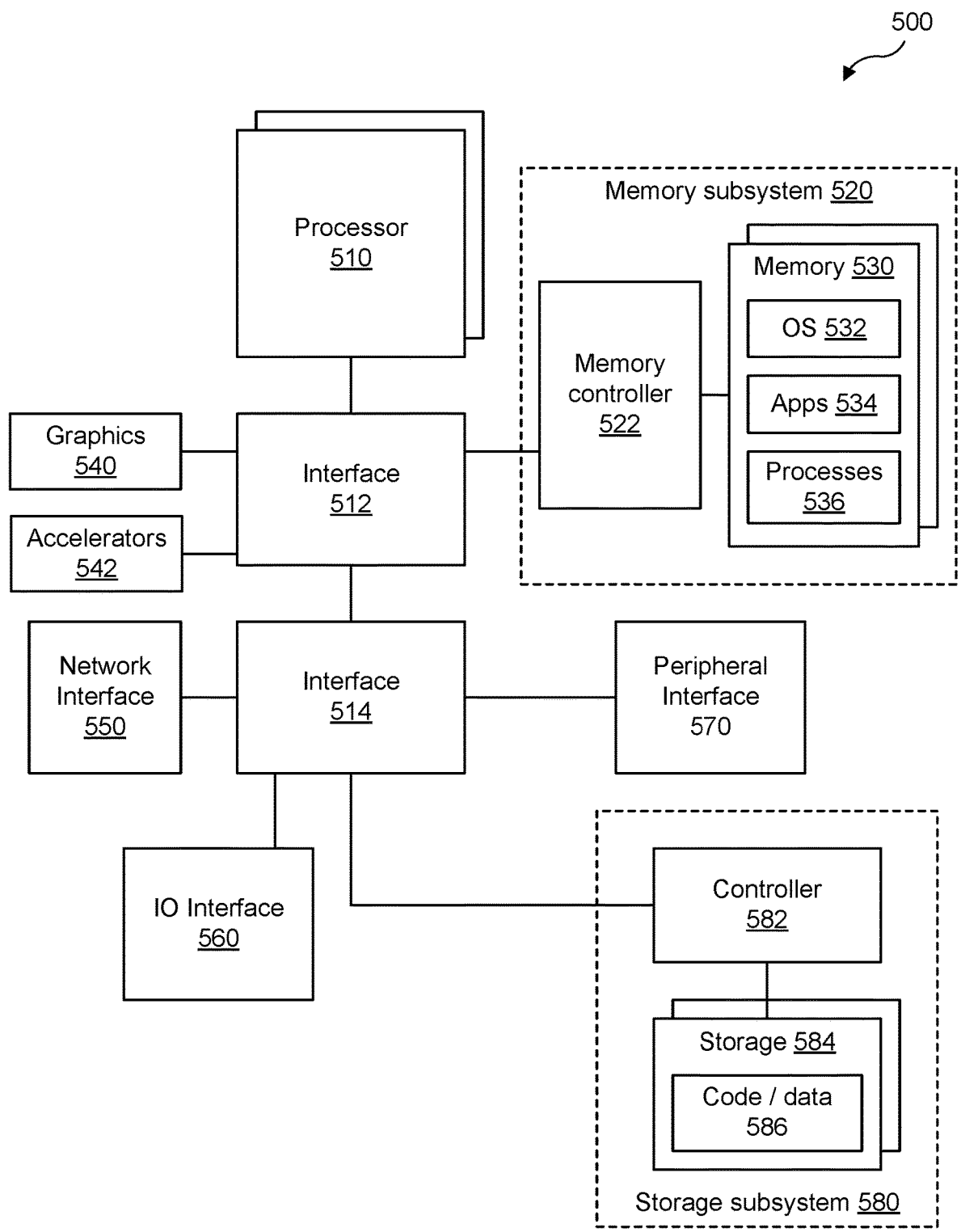
FIG. 5 is a diagram of a system that may be implemented with aspects of the embodiments described and illustrated herein.

FIG. 5 depicts a compute node 500 in which aspects of the embodiments disclosed above may be implemented. Compute node 500 includes one or more processors 510, which provides processing, operation management, and execution of instructions for compute node 500. Processor 510 can include any type of microprocessor, central processing unit (CPU), graphics processing unit (GPU), processing core, multi-core processor or other processing hardware to provide processing for compute node 500, or a combination of processors. Processor 510 controls the overall operation of compute node 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute node 500 includes interface 512 coupled to processor 510, which can represent a higher speed interface or a high throughput interface for system components that needs higher bandwidth connections, such as memory subsystem 520 or optional graphics interface components 540, or optional accelerators 542. Interface 512 represents an interface circuit, which can be a standalone component or integrated onto a processor die. Where present, graphics interface 540 interfaces to graphics components for providing a visual display to a user of compute node 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

In some embodiments, accelerators 542 can be a fixed function offload engine that can be accessed or used by a processor 510. For example, an accelerator among accelerators 542 can provide data compression capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of compute node 500 and provides storage for code to be executed by processor 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in compute node 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for compute node 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510.

While not specifically illustrated, it will be understood that compute node 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute node 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides compute node 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor 510, and memory subsystem 520.

In one example, compute node 500 includes one or more IO interface(s) 560. IO interface 560 can include one or more interface components through which a user interacts with compute node 500 (e.g., audio, alphanumeric, tactile/touch, or other interfacing). Peripheral interface 570 can include any hardware interface not specifically mentioned above. Peripherals refer generally to devices that connect dependently to compute node 500. A dependent connection is one where compute node 500 provides the software platform or hardware platform or both on which operation executes, and with which a user interacts.

In one example, compute node 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (i.e., the value is retained despite interruption of power to compute node 500). Storage 584 can be generically considered to be a "memory," although memory 530 is typically the executing or operating memory to provide instructions to processor 510. Whereas storage 584 is nonvolatile, memory 530 can include volatile memory (i.e., the value or state of the data is indeterminate if power is interrupted to compute node 500). In one example, storage subsystem 580 includes controller 582 to interface with storage 584. In one example controller 582 is a physical part of interface 514 or processor 510 or can include circuits or logic in both processor 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007), DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of compute node 500. More specifically, power source typically interfaces to one or multiple power supplies in compute node 500 to provide power to the components of compute node 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, compute node 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for implementing a Function as a Service (FaaS), comprising:

implementing one or more sets of FaaS functions clustered by flavor chaining to deploy one or more FaaS flavor clusters on one or more edge nodes, wherein each flavor is defined by a set of resource requirements mapped into a jitter Quality of Service (QoS) and is executed on at least one hardware computing component on the one or more edge nodes; and implementing at least one jitter controller to control and monitor execution of FaaS functions in the one or more FaaS flavor clusters such that the functions are executed to meet jitter-less QoS requirements.

2. The method of claim 1, further comprising implementing a jitter-less Software Defined Wide Area Network (SD-WAN) to provide network resources used by at least one FaaS flavor cluster.

3. The method of claim 2, wherein a first FaaS flavor cluster is implemented in a distributed manner across multiple edge nodes, and wherein the SD-WAN is implemented to satisfy connectivity requirements between the multiple edge nodes.

4. The method of claim 2, further comprising implementing a data center jitter controller to create the SD-WAN and instantiate functions in the one or more FaaS flavor clusters with a corresponding jitter-less QoS target.

5. The method of claim 4, wherein the data center jitter controller monitors and enforces jitter-less QoS during the life of a service implemented via an FaaS flavor cluster.

6. The method of claim 1, wherein execution of functions for at least one FaaS flavor cluster is distributed across multiple edge nodes, further comprising distributing and connecting functions in real-time to be executed with corresponding jitter requirements.

7. The method of claim 6, wherein distributing and connecting functions in real-time to be executed with corresponding jitter requirements is implemented using distributed jitter controllers implemented in hardware on the multiple edge nodes.

8. The method of claim 1, wherein execution of functions for at least one FaaS flavor cluster is distributed across multiple edge nodes, and the jitter controller is a distributed jitter controller.

9. The method of claim 1, further comprising implementing a software stack including application program interfaces (APIs) comprising a jitter QoS class and a jitter QoS connector class.

10. The method of claim 1, wherein functions in at least one FaaS flavor cluster are executed on deterministic hardware in a manner that ensures execution of the functions are completed within an expected jitter metric.

11. A system for implementing a distributed Function as a Service (FaaS) comprising:
a plurality of edge nodes, each having one or more hardware computing components including a central processing unit (CPU), the hardware computing components configured to execute functions corresponding to FaaS flavors; and
at least one jitter controller,
wherein the system is configured to implement at set of FaaS functions clustered by flavor chaining to deploy one or more distributed FaaS flavor clusters on the plurality of edge nodes, wherein each flavor is defined by a set of resource requirements mapped into a jitter Quality of Service (QoS) and is executed on at least one hardware computing component, and
wherein the at least one jitter controller is configured to control and monitor execution of FaaS functions in the one or more FaaS flavor clusters using the hardware computing components such that the functions are executed to meet jitter-less QoS requirements.

12. The system of claim 11, further comprising a jitter-less Software Defined Wide Area Network (SD-WAN) to provide network resources used by at least one FaaS flavor cluster.

13. The system of claim 11, wherein the at least one jitter controller includes a data center jitter controller configured to instantiate functions in the one or more FaaS flavor clusters with a corresponding jitter-less QoS target.

14. The system of claim 13, wherein the data center jitter controller monitors and enforces jitter-less QoS during the life of a service implemented via an FaaS flavor cluster.

15. The system of claim 11, wherein an edge node includes a platform jitter-less function controller configured to distribute and connect functions in real-time to be executed with corresponding jitter requirements.

16. An edge node configured to be deployed in a system including multiple edge nodes in which a distributed Function as a Service (FaaS) is implemented, comprising:
a central processing unit (CPU);
one or more memory devices, coupled to the CPU;
at least two hardware computing components including the CPU;
software comprising a plurality of FaaS flavors, each flavor comprising an FaaS function configured to be executed on a hardware computing component that is defined by a set of resources requirements mapped into jitter Quality of Service (QoS); and
a platform jitter-less function controller configured to discover FaaS flavors and associated jitter properties.

17. The edge node of claim 16, wherein the platform jitter-less function controller is implemented in hardware.

18. The edge node of claim 16, wherein the platform jitter-less function controller is configured to distribute and connect functions in real-time to be executed with corresponding jitter requirements.

19. The edge node of claim 16, further comprising a table associating FaaS flavors with corresponding jitter QoS and resource requirements stored in a memory device.

20. The edge node of claim 16, wherein the hardware computing components include two or more of a CPU, a graphics processing unit (GPU), an artificial intelligence (AI) accelerator, and a field programmable gate array (FPGA).

* * * * *